United States Patent

Yamamoto et al.

[11] Patent Number: 5,383,261
[45] Date of Patent: Jan. 24, 1995

[54] TURRET MACHINE TOOL

[75] Inventors: Hiroshi Yamamoto; Takeshi Ohkubo, both of Saitama, Japan

[73] Assignee: Honda Giken Kogyo Kabushiki Kaisha, Japan

[21] Appl. No.: 158,684

[22] Filed: Nov. 24, 1993

[30] Foreign Application Priority Data

Nov. 24, 1992 [JP] Japan .................. 4-336637
Nov. 24, 1992 [JP] Japan .................. 4-336638
Nov. 24, 1992 [JP] Japan .................. 4-336639

[51] Int. Cl.⁶ .................... B23B 29/32; B23B 39/20
[52] U.S. Cl. ........................................ 29/40; 29/39; 408/35
[58] Field of Search ............... 29/39, 40, 36, 48.5 A, 29/48.5 R, 41, 43, 44; 408/35; 483/24, 25, 39, 41

[56] References Cited

U.S. PATENT DOCUMENTS

| 2,682,698 | 7/1954 | Berthiez | 408/35 X |
| 2,991,666 | 7/1961 | Charlat | 408/35 X |
| 3,023,677 | 3/1962 | Charlat | 29/41 X |
| 3,762,036 | 10/1973 | Goebel et al. | |
| 3,797,363 | 3/1974 | Nohejl | |
| 4,125,932 | 11/1978 | Kielma et al. | |
| 4,887,345 | 12/1989 | Saito et al. | 483/39 |
| 5,146,663 | 9/1992 | Buessinger | 29/40 |

FOREIGN PATENT DOCUMENTS

52-80586 6/1977 Japan .
776772 11/1980 U.S.S.R. .................. 408/35

*Primary Examiner*—William Briggs
*Attorney, Agent, or Firm*—Merchant, Gould, Smith, Edell, Welter & Schmidt

[57] ABSTRACT

A turret machine tool includes a support base, a slide base slidably mounted on the support base and having a slant surface, a turret head indexably disposed on the slant surface of the slide base for indexing movement about an axis, and a plurality of machining spindle modules mounted on the turret head at equal angular intervals about the axis and projecting radially outwardly from the turret head. The turret head has a plurality of attachments each including an outwardly open cavity and an attachment frame defining the outwardly open cavity and having an outer attachment surface. Each of the machining spindle modules has a front module portion, a rear module portion extending rearwardly from the front module portion, and a front plate integral with the front module portion and disposed between and coupled to the front module portion and the rear module portion, the front plate having a attachment edge extending radially outwardly beyond the rear module portion. The machining spindle modules are installed on the attachments, respectively, with the rear module potions being housed in the cavities, respectively, and the attachment edges being held against the outer attachment surfaces, respectively.

8 Claims, 9 Drawing Sheets

2

TURRET MACHINE TOOL

BACKGROUND OF THE INVENTION

1. Field of the Invention

The present invention relates to a turret machine tool having a plurality of exchangeable machining spindle modules.

2. Description of the Prior Art

One known turret machine tool is disclosed in Japanese laid-open patent publication No. 52-80586 published Jul. 7, 1977.

The disclosed turret machine tool includes a turret head having a plurality of open attachment surfaces spaced at equal intervals, and a plurality of machining spindle modules having respective gear cases and removably mounted at their rear ends on the respective attachment openings.

More specifically, each of the machining spindle modules comprises a plurality of spindles projecting from its front end, a housing that holds the spindles, and a gear case housing a number of gears. Therefore, the machining spindle modules are relatively heavy and hence need to be securely fastened to the turret head by bolts.

The machining spindle modules project largely from the open attachment surfaces of the turret head, i.e., have a large overhang from the open attachment surfaces. Because of the large overhang of the heavy machining spindle modules, the tip ends of tools attached to the respective spindles may be tilted downwardly if the gear cases are not rigid enough. Positional errors caused by the tilted displacement of the tools tend to lower the dimensional accuracy of a workpiece that is machined by the turret machine tool.

The rigidity of the gear cases may be increased by increasing the wall thickness of the gear cases. However, an increase in the wall thickness of the gear cases results in an increase in the weight thereof, which must in turn be carried by the turret head with increased rigidity.

Since the machining spindle modules have large overhang and weight, when the turret head which supports the machining spindle modules is indexed by an indexing mechanism, the machining spindle modules are subjected to large inertia, tending to develop undue stresses in the indexing mechanism and fastening elements such as positioning pins by which the turret head is mounted on a machine tool base.

Heretofore, the turret head of a turret machine tool is positioned with respect to the machine tool base generally by means of a clamp mechanism. However, the clamp mechanism is complex in structure, and requires a cam mechanism and a hydraulic system for actuating the clamp mechanism itself. Consequently, the assembly of the clamp mechanism and its associated devices is highly complicated, composed of a large number of parts, and large in size, imposing limitations on their installation in a limited space within the turret head and the slide base. Each time the turret head is indexed, it has to be unclamped and clamped by the clamp mechanism. Therefore, the cycle time of an indexing operation is relatively long, and the efficiency of the turret machine tool is relatively low.

SUMMARY OF THE INVENTION

It is an object of the present invention to provide a turret machine tool which includes machining spindle modules having a reduced weight and a reduced overhang from respective attachment surfaces of a turret head, the machining spindle modules and the turret head being integrally coupled to each other with increased rigidity for increasing the positional accuracy of tools of the machining spindle modules and the machining accuracy with which a workpiece is machined by the tools.

Another object of the present invention is to provide a turret machine tool which has a turret head that, when indexed, can reliably be positioned and fixed to a slide base by a simple space-saver mechanism, rather than a large complex mechanism such as a clamp mechanism, without being mechanically clamped and unclamped and hence in a reduced cycle time for improved efficiency.

According to the present invention, there is provided a turret machine tool comprising a support base, a slide base slidably mounted on the support base and having a slant surface, a turret head indexably disposed on the slant surface of the slide base for indexing movement about an axis, and a plurality of machining spindle modules mounted on the turret head at equal angular intervals about the axis and projecting radially outwardly from the turret head, the turret head having a plurality of attachments each including an outwardly open cavity and an attachment frame defining the outwardly open cavity and having an outer attachment surface, each of the machining spindle modules having a front module portion, a rear module portion extending rearwardly from the front module portion, and a front plate integral with the front module portion and disposed between and coupled to the front module portion and the rear module portion, the front plate having a attachment edge extending radially outwardly beyond the rear module portion, the machining spindle modules being installed on the attachments, respectively, with the rear module potions being housed in the cavities, respectively, and the attachment edges being held against the outer attachment surfaces, respectively.

The rear module portion of each of the machining spindle modules may have a sleeve assembly extending rearwardly and fitted in a hole defined in and extending through a bottom wall of the outwardly open cavity.

The rear module portion of each of the machining spindle modules may further include a seal ring fitted over the sleeve assembly which is fitted in the hole.

The slant surface may be inclined at at least 45° to a direction in which the slide base is slidable on the support base, and the axis may be inclined at at least 45° to the direction.

The turret head may have a cavity defined therein behind the bottom walls of the outwardly open cavities, the front module portion of each of the machining spindle modules may comprise a spindle housing which supports a plurality of spindles therein, and the rear module portion of each of the machining spindle modules may comprise a gear case which houses a transmission gear mechanism including at least an input shaft extending coaxially through the sleeve for transmitting drive forces to the spindles and having an end projecting into the cavity in the turret head. The turret machine tool may further comprise an actuator supported on the slide base and having an output shaft for rotating the spindle through the transmission gear mechanism, and clutch means disposed in the cavity for selectively connecting and disconnecting the input shaft and the output shaft.

The turret machine tool may further include a first stop mounted on the turret head, a second stop mounted on the slide base for engaging the first stop when the first stop is angularly moved with the turret head upon indexing movement thereof, and a fluid pressure motor mounted on the slide base for angularly moving the turret head about the axis to bring the first stop into engagement with the second stop and pressing the first stop against the second stop thereby to index and lock the turret head with respect to the slide base.

The turret machine tool may further comprise a control cam mounted on an outer circumferential edge of the turret head, control valve means mounted on the slide base and engageable by the control cam for producing a progressively increasing control quantity in response to angular movement of the turret head, before the first stop engages the second stop, and fluid pressure control means for progressively reducing a fluid pressure supplied to the fluid pressure motor in response to the progressively increasing control quantity produced by the control valve means for thereby reducing a speed at which the turret head is angularly moved, before the first stop engages the second stop.

The fluid pressure control means may comprise means for keeping a predetermined fluid pressure supplied to the fluid pressure motor to maintain the first stop in engagement with the second stop for thereby keeping the turret head indexed and locked with respect to the slide base, after the first stop has engaged the second stop.

The turret machine tool may further comprise a bearing disposed between the slide base and the turret head under a preload applied to the bearing.

Each of the attachments may include clamp means for fastening the front plate to the attachment frame.

The front plate may have a plurality of engageable members, the clamp means comprising a plurality of toggle clamps mounted on the attachment frame for engaging the engageable members, respectively.

The attachment frame may comprise two first frame members extending substantially parallel to each other and a second frame member extending between and joining ends of the first frame members, each of the first frame members having two of the toggle clamps.

The front plate may have a positioning hole defined therein, the attachment frame having a positioning pin projecting on the outer attachment surface and fittable in the positioning hole for positioning the machining spindle module with respect to the turret head.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
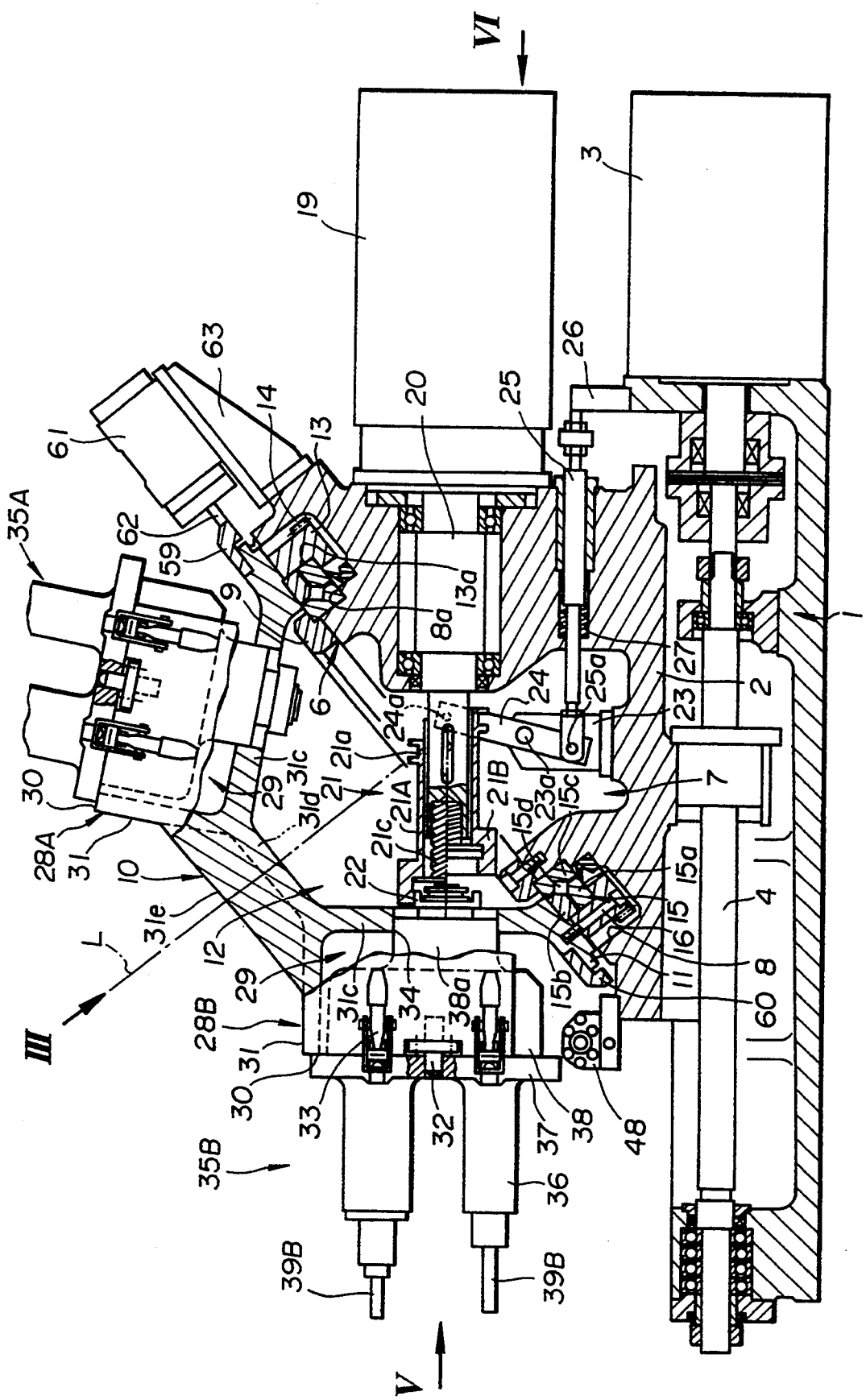
FIG. 1 is a sectional side elevational view of a turret machine tool according to the present invention.

As shown in FIG. 1, a turret machine tool according to the present invention includes a support base 1 with a pair of spaced guide rails 5 (see FIGS. 5 and 6) mounted thereon, and a slide base 2 slidably engaging and mounted on the guide rails 5 for movement therealong parallel to the sheet of FIG. 1. The slide base 2 can be moved along the guide rails 5 by a servomotor 3 mounted on a rear end of the support base 1 and a feed screw mechanism 4 disposed in the support base 1 and extending parallel to the guide rails 5, the feed screw mechanism 4 having an end coupled to the servomotor 3 and an intermediate portion joined to the slide base 2.

As shown in FIG. 1, the slide base 2 is substantially in the shape of a rectangular triangle as viewed in side elevation, and has a front slant surface 6 which is inclined at a certain angle rearwardly in the upward direction. A turret head 10 is indexably mounted on the slant surface 6.

The slide base 2 has a forwardly open cavity 7 defined centrally in the slant surface 6 and an annular recess 8 defined in the slant surface 6 in surrounding relationship to the cavity 7. The turret head 10 has a cavity 12 defined in its rear surface which faces the slide base 2 and held in communication with the cavity 7. The cavity 12 and the turret head 10 are substantially trapezoidal in shape as viewed in side elevation.

Figure 3:
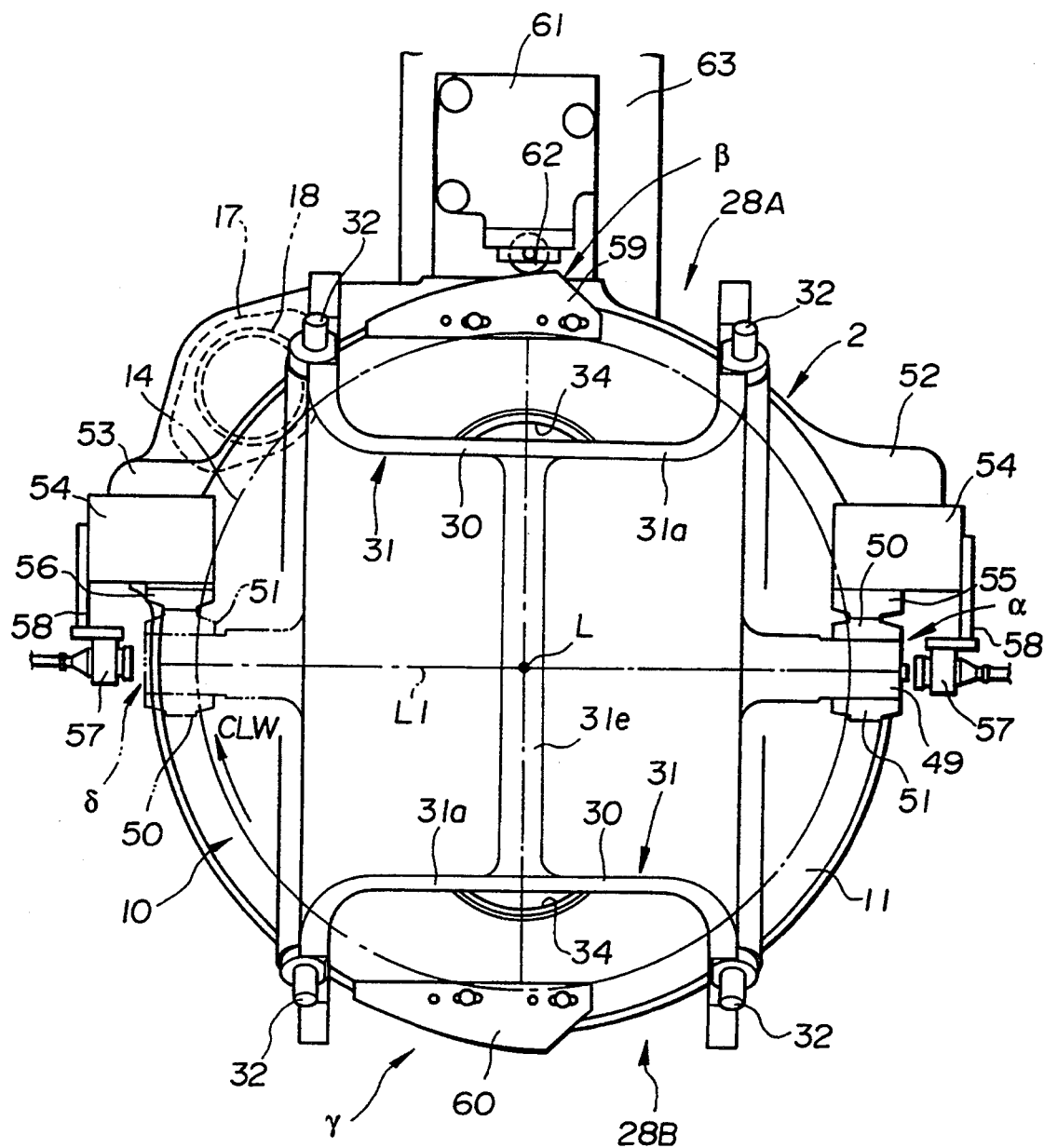
FIG. 3 is a plan view of a portion of the turret machine tool as viewed in the direction indicated by the arrow III in FIG. 1, with machining spindle modules being omitted from illustration.

As shown in FIG. 3, the turret head 10 has an annular flanged base 11 extending along its rear surface and positioned closely to the slanted surface 6 of the slide base 2. As shown in FIG. 1, the turret head 10 is rotatable, i.e., indexable, about an axis L which is inclined at at least 45° to the direction in which the slide base 2 is slidable along the guide rails 5. The slant surface 6, which lies closely parallel to the annular flanged base 11, is also inclined at at least 45° to the direction in which the slide base 2 is slidable along the guide rails 5.

The turret head 10 has a pair of upper and lower attachments 28A, 28B for supporting machining spindle modules 35A, 35B, respectively, symmetrically one on each side of the axis L. The upper and lower attachments 28A, 28B are inclined at 45° to the axis L. The turret head 10 also has an annular holder 13 fixed to the rear surface of the annular flanged base 11, preferably along its circumferential edge, the annular holder 13 having gear teeth 14 on its outer circumferential surface. Therefore, the annular holder 13 with the gear teeth 14 serves as an external ring gear.

Figure 4:
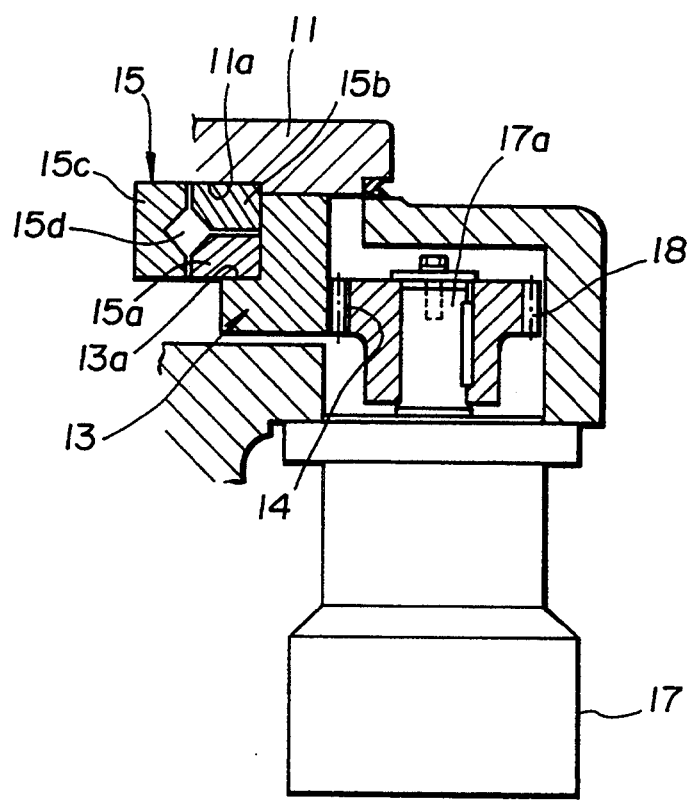
FIG. 4 is an enlarged fragmentary vertical cross-sectional view of a rotating mechanism for a turret head of the turret machine tool.

As shown in FIGS. 1 and 4, the annular holder 13 includes a flange 13a extending radially inwardly from a lower end, and the annular flanged base 11 has a stepped surface 11a on its rear surface. A cross roller bearing 15 includes upper and lower outer races 15a, 15b sandwiched between the flange 13a and the stepped surface 11a. As shown in FIG. 1, the cross roller bearing 15 has an inner race 15c which is sandwiched between a stepped surface 8a defined radially inwardly of the annular recess 8 and an annular presser 9 fixedly mounted on the slant surface 6 in surrounding relationship to the cavity 7. The cross roller bearing 15 has a bearing element 15d disposed between the outer races 15a, 15b and the inner race 15c.

The annular holder 13 is fastened to the rear surface of the annular flanged base 11 by a preload adjusting screw 16. The cross roller bearing 15 is adjustably clamped under a preload of 2 tons, for example, by the preload adjusting screw 16. The turret head 10 and the slide base 2 are thus coupled to each other with high rigidity through the cross roller bearing 15 to which a high preload is applied by the preload adjusting screw 16.

Figure 6:
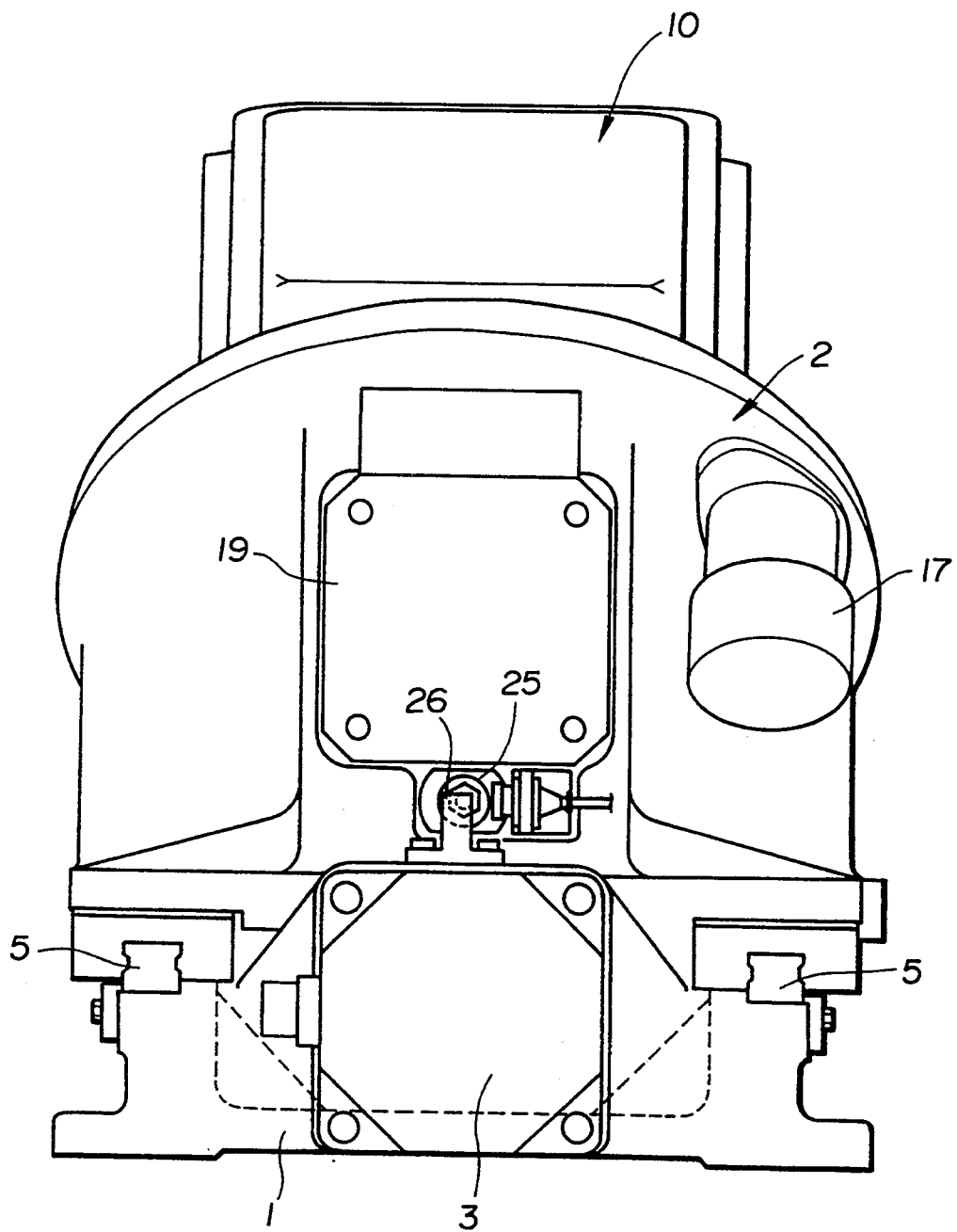
FIG. 6 is a rear elevational view of a portion of the turret machine tool as viewed in the direction indicated by the arrow VI in FIG. 1, with machining spindle modules being omitted from illustration.

As shown in FIGS. 4 and 6, a fluid pressure motor 17, specifically a hydraulic motor, is mounted on a rear surface of the slide base 2 remote from the slant surface 6. The hydraulic motor 17 has an output shaft 17a on which there is fixedly mounted a pinion 18 that is held in mesh with the gear teeth 14 of the annular holder 13. Therefore, when the hydraulic motor 17 is actuated, the turret head 10 is indexed in one direction or the other.

As shown in FIGS. 1 and 6, a spindle motor 19 is mounted on the rear surface of the slide base 2 and has an output shaft 20 extending horizontally into the slide base 2. The output shaft 20 has a distal end portion extending into the cavities 7, 12 and is combined with an axially slidable serration clutch 21. More specifically, the distal end portion of the output shaft 20 comprises an externally serrated shaft, and the serration clutch 21 has an internally serrated sleeve 21A axially slidably fitted over the externally serrated shaft. The sleeve 21A includes a larger-diameter sleeve clutch member 21B on its distal end which is internally serrated. A compression coil spring 21C is disposed under compression between the tip end of the output shaft 20 and a base end of the sleeve clutch member 21B for normally urging the serration clutch 21 to move to the left in FIG. 1 with respect to the output shaft 20, i.e., into engagement with an input shaft 43 (see FIG. 7) of a machining spindle module 35A, 35B, described later on. The rear end of the input shaft 43 projects into the cavity 12 in the turret head 10. The projected rear end of the input shaft 43 has an externally serrated clutch member 22 which can releasably be engaged by the sleeve clutch member 21B. In FIG. 1, the serrated clutch member 22 is shown as engaged by the serration clutch 21, i.e., the sleeve clutch member 21B, in an upper half of the serration clutch 21, and as disengaged from the sleeve clutch member 21B in a lower half of the serration clutch 21.

The serration clutch 21 can be brought into and out of engagement with the serrated clutch member 22 by a rock lever 24 that is pivotally supported at its center by a pin 23a on a bracket 23 on the bottom of the cavity 7. The rock lever 24 has a pin 24a on an end thereof engaging in a groove 21a defined in the outer circumference of the rear end of the sleeve 21A. The other end of the rock lever 24 is pivotally coupled by a pin 25a to an end of a push rod 25 which extends axially movably through a lower rear wall of the slide base 2. The other end of the push rod 25 which projects rearwardly out of the slide base 2 is engageable by a stop 26 mounted on the rear end of the support base 1. The push rod 25 is normally urged by a spring 27 to axially move rearwardly to the right in FIG. 1. When the turret head 10 is moved rearwardly to a rear end of its stroke as shown in FIG. 1, the push rod 25 is engaged by the stop 26 and axially moved to the left against the bias of the spring 27, causing the rock lever 24 to turn clockwise about the pin 23a thus moving the serration clutch 21 out of engagement with the serrated clutch member 22 as shown in the lower half of the serration clutch 21. When the turret head 10 is moved forwardly to the left in FIG. 1, the push rod 25 is disengaged from the stop 26 and axially moved to the right under the bias of the spring 27, causing the rock lever 24 to turn counterclockwise about the pin 23a thus moving the serration clutch 21 into engagement with the serrated clutch member 22 as shown in the upper half of the serration clutch 21. At this time, the rotation of the output shaft 20 of the spindle motor 19 can be transmitted through the serration clutch 21 and the serrated clutch member 22 to the input shaft 43 of the machining spindle module 35A, 35B.

Figure 5:
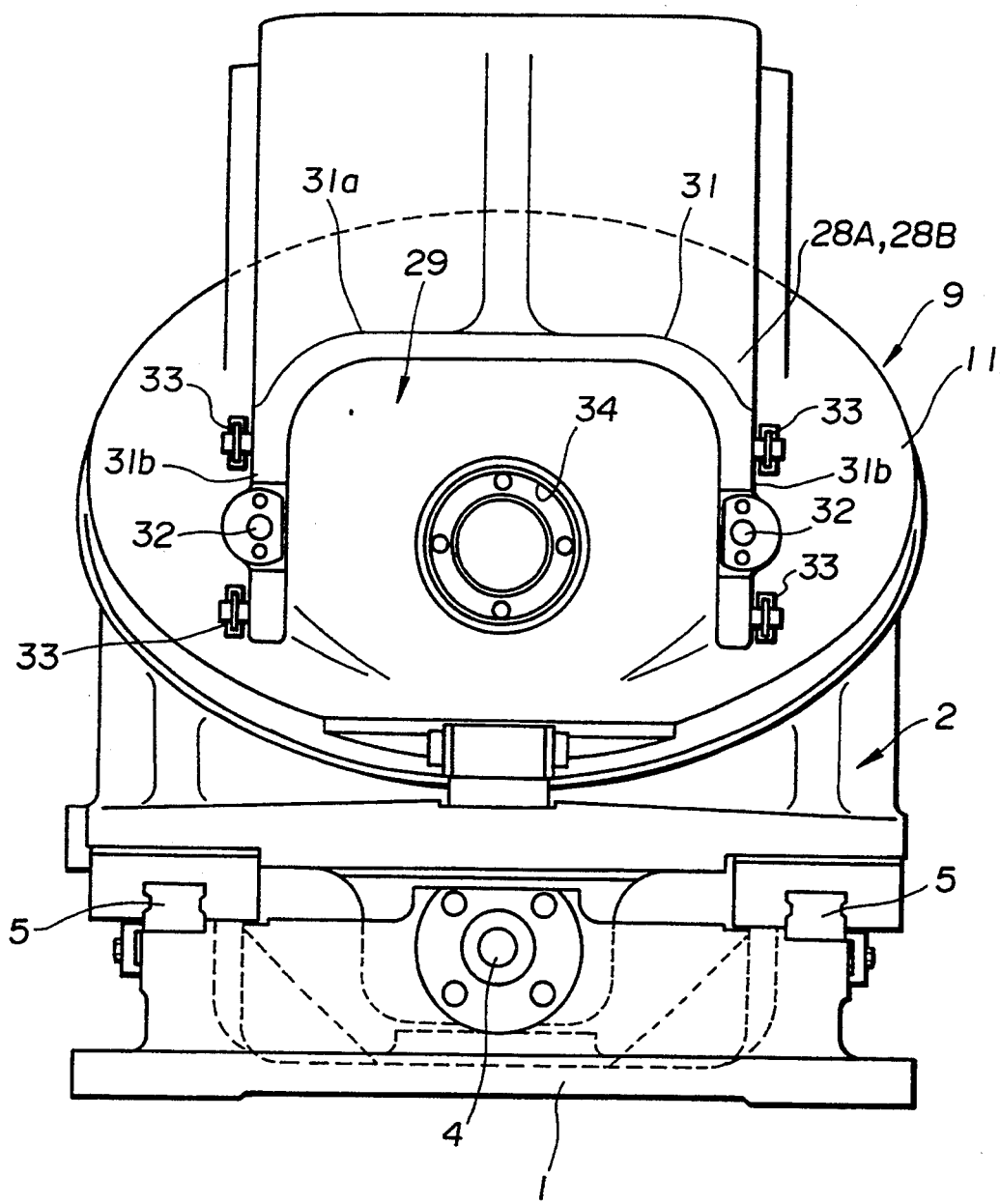
FIG. 5 is a front elevational view of a portion of the turret machine tool as viewed in the direction indicated by the arrow V in FIG. 1, with machining spindle modules being omitted from illustration.

The upper and lower attachments 28A, 28B on the turret head 10 are symmetrically positioned in 180°-spaced relationship with respect to the axis L of the turret head 10. Each of the upper and lower attachments 28A, 28B has a outwardly open cavity 29 defined in the turret head 10 and an attachment frame 31 surrounding the cavity 29 and having an attachment surface 30 on the end thereof, the cavity 29 having a bottom wall 31c. As shown in FIG. 3, the attachment frames 31 of the attachments 28A, 28B are of a U shape opening away from each other symmetrically in 180°-spaced relationship to each other. However, the attachment frames 31 of the attachments 28A, 28B may be of a closed rectangular shape. As shown in FIG. 5, each of the attachment frames 31 comprises a pair of substantially parallel vertical frame members 31b and a horizontal frame member 31a extending between and joining ends of the vertical frame members 31b. As shown in FIGS. 1 and 3, the horizontal frame members 31a of the attachment frames 31 are interconnected by a rib 31e. As shown in FIG. 1, the bottom walls 31c of the cavities 29 of the upper and lower attachments 28A, 28B are interconnected by a joint wall 31d integral with the rib 31e. The cavity 12 is defined by the bottom walls 31c and the joint wall 31d.

The bottom walls 31c have respective circular holes 34 defined therein for receiving therein respective rear ends of the machining spindle module 35A, 35B including the input shafts 43 thereof. When one of the machining spindle modules 35A, 35B, e.g., the machining spindle module 35B, is in an index position, as shown in FIG. 1, the serration clutch 21 is located concentrically behind the circular hole 34 of the attachment 28B on which the machining spindle module 35B is supported.

As shown in FIGS. 3 and 5, each of the attachment frames 31 has a pair of positioning pins 32 projecting forwardly from the attachment surface 30 at the respective vertical frame members 31b, and two pairs of toggle clamps 33 projecting laterally from outer surfaces of the respective vertical frame members 31b.

The machining spindle module 35A, 35B are supported respectively on the attachments 28A, 28B as shown in FIG. 1.

Figure 7:
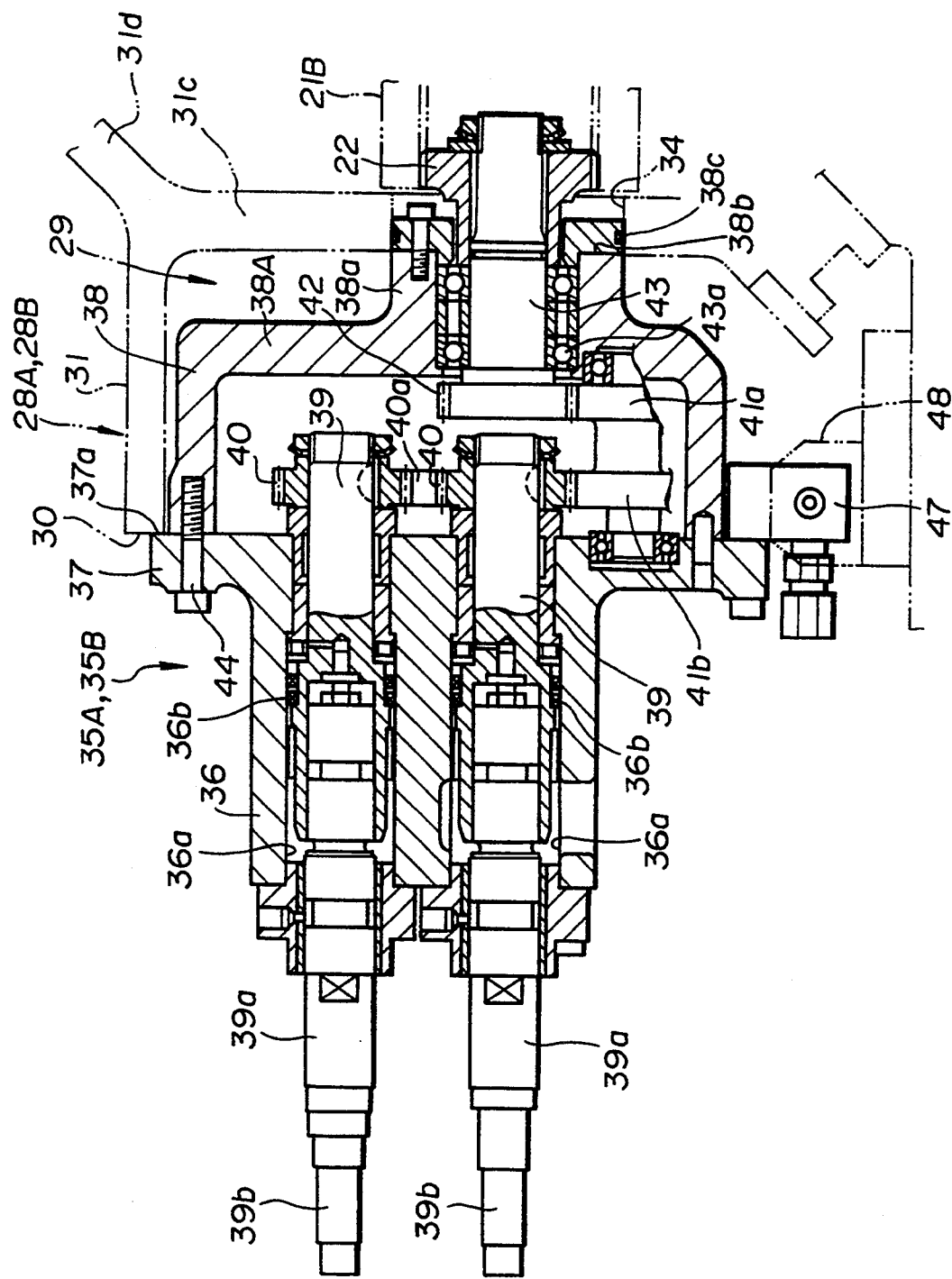
FIG. 7 is an enlarged vertical cross-sectional view of a machining spindle module mounted on the turret head.
Figure 8:
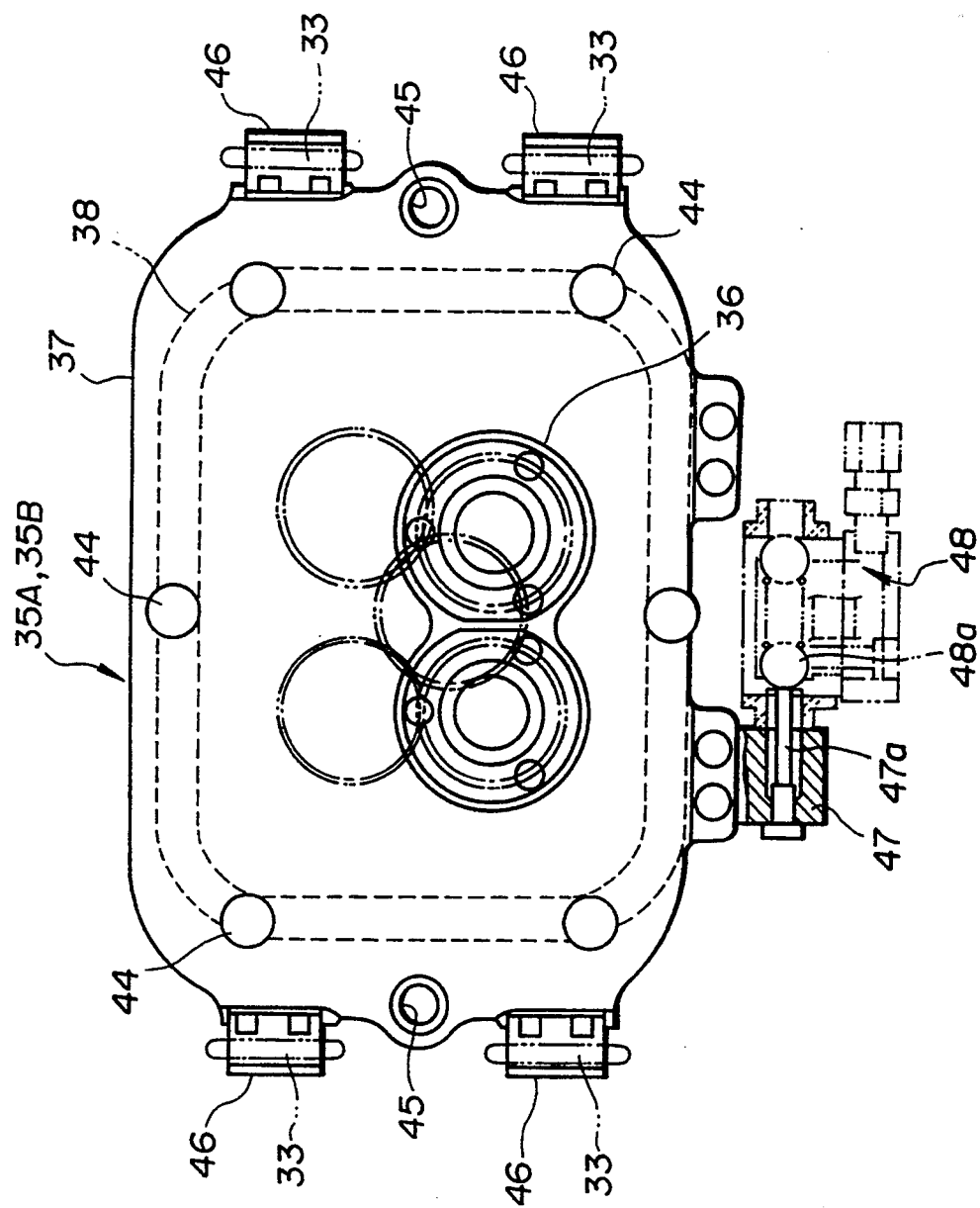
FIG. 8 is a front elevational view of the machining spindle module shown in FIG. 7.

Each of the machining spindle module 35A, 35B is shown in detail in FIGS. 7 and 8.

As shown in FIGS. 7 and 8, each of the machining spindle module 35A, 35B primarily comprises a substantially rectangular front plate 37 which is horizontally elongate when viewed in plan and has rounded corners, a spindle housing 36 (front module portion) integrally projecting forwardly from the front plate 37, a box-shaped gear case 38 (rear module portion) fastened to a rear surface of the front plate 37 by bolts 44 and projecting rearwardly therefrom, a pair of spindles 39 extending through and supported by the spindle housing 36, transmission gears 41a, 41b held in mesh with input gears 40 mounted on the respective rear ends of the spindles 39, and an input shaft 43 operatively coupled to the transmission gears 41a, 41b through an output gear 42. The output gear 42 is fixedly mounted on the front end of the input shaft 43 which extends into the gear case 38, and meshes with the transmission gear 41a. The transmission gear 41b, which is coupled coaxially to the transmission gear 41a, is held in mesh with upper and lower idle gears 40a which are held in mesh with the input gears 40. The gears 42, 41a, 41b, 40a, 40 are housed in the gear case 38. The input shaft 43 has a rear end extending rearwardly through a sleeve 38a of the gear case 38, and coupled through the serrated clutch member 22 and the serration clutch 21 to the output shaft 20 of the spindle motor 19. Therefore, when the serration clutch 21 engages the serrated clutch member 22, the drive forces from the spindle motor 19 are transmitted from the input shaft 43 through the gears 42, 41a, 41b, 40a, 40 to the spindles 39 and hence tools 39b mounted respectively on the front ends of the spindles 39.

The spindle housing 36 has a pair of spindle holes 36a defined therein and extending from its front end toward the front plate 37 where the spindle holes 36a are open at its rear surface. The spindles 39 which support respective tool holders 39a axially on their front ends are rotatably mounted in the spindle holes 36a by respective bearings 36b. The tool holders 39a extend forwardly from the front end of the spindle housing 36, with the tools 39b mounted on the front ends, respectively, of the tool holders 39a. The gear case 38 is joined to the rear surface of the front plate 37 along the peripheral edge thereof which projects outwardly beyond the peripheral edge of the gear case 38 as an attachment edge 37a held against the attachment surface 30 of one of the attachment 28A, 28B of the turret head 10.

The machining spindle modules 35A, 35B are mounted respectively on the attachment 28A, 28B as follows: The attachment edge 37a of the front plate 37 is held against the attachment surface 30, and positioning holes 45 defined in respective sides of the front plate 37 are fitted over the positioning pins 32, respectively, on the attachment surface 30. The toggle clamps 33, serving as clamp means, are brought into engagement with respective attachment seats 46, serving as engageable members, on the sides of the front plate 37, thereby fastening the front plate 37 against the attachment surface 30. In this manner, the machining spindle modules 35A, 35B are installed on the respective attachments 28A, 28B.

The gear case 38 is housed in the cavity 29 and has a bottom wall 38A with the sleeve 38a integrally projecting rearwardly therefrom. The input shaft 43 is rotatably supported in the sleeve 38a by bearings 43a. A bushing 38b is held against and fastened to the rear end of the sleeve 38a by a bolt. The bushing 38b is fitted in the circular hole 34 in the bottom wall 31c. The bushing 38b has an annular groove defined in an outer circumferential surface thereof which is held against the inner circumferential surface of the circular hole 34, and a seal ring 38c is fitted in the annular groove.

Since the gear case 38 is housed in the turret head 10, the overhang of the machining spindle modules 35A, 35B from the attachment surfaces 30 is reduced, thus minimizing downward displacement of the tools 39b on the front ends of the tool holders 39a for highly accurate machining operation. Inasmuch as the gear case 38 is not directly attached to the turret head 10 and not involved in the installation of the machining spindle modules 35A, 35B on the respective attachments 28A, 28B, the gear case 38 may be reduced in wall thickness for a reduction in the weight of the machining spindle modules 35A, 35B. As a result, the inertia to which the turret head 10 and the machining spindle modules 35A, 35B are subjected is reduced when the turret head 10 is indexed, preventing undue stresses from being developed in the indexing mechanism and the positioning pins. Consequently, the turret head 10 can smoothly be indexed. The fitting engagement of the sleeve 38a in the circular hole 34 allows the gear case 38 to be positioned radially with respect to the attachments 28A, 28B and also to be coupled thereto with high rigidity against stresses developed when the drive forces are transmitted through the serration clutch 21 and the serrated clutch member 22 behind the circular hole 34. The machining spindle modules 35A, 35B are fastened against the attachment surfaces 30 of the respective attachments 28A, 28B through the respective front plates 37 which are integral with the spindle housings 36 and positioned substantially intermediate in the longitudinal direction of the machining spindle modules 35A, 35B. Therefore, the machining spindle modules 35A, 35B are coupled to the respective attachments 28A, 28B with high rigidity.

As described above, the machining spindle modules 35A, 35B are mounted on the respective attachments 28A, 28B through abutting engagement between the attachment edges 37a and the attachment surfaces 30. It is relatively easy to achieve a desired level of parallelism and flatness of the attachment edges 37a and the attachment surfaces 30, and also a desired level of verticality of the attachment edges 37a and the attachment surfaces 30 when one of the machining spindle modules 35A, 35B is in a machining position. Therefore, the machining spindle module 35B which is in the machining position in FIG. 1 can hold the spindles 39 and hence the tools 39b accurately horizontally.

As shown in FIGS. 7 and 8, a cutting oil receptacle 47, doubling as a stop, extends downwardly from a lower edge of the front plate 37. In the machining position, the cutting oil receptacle 47 abuts against a supply valve 48, and a pin 47a of the cutting oil receptacle 47 pushes a ball 48a of the supply valve 48, allowing cutting oil to be supplied from the supply valve 48 through the cutting oil receptacle 47 to the spindles 39.

The turret head 10 is indexed by the hydraulic motor 17 through the pinion 18 and the gear teeth 14 on the annular holder 13. Now, an indexing, positioning, and fixing mechanism for the turret head 10 will be described in detail below.

Figure 2:
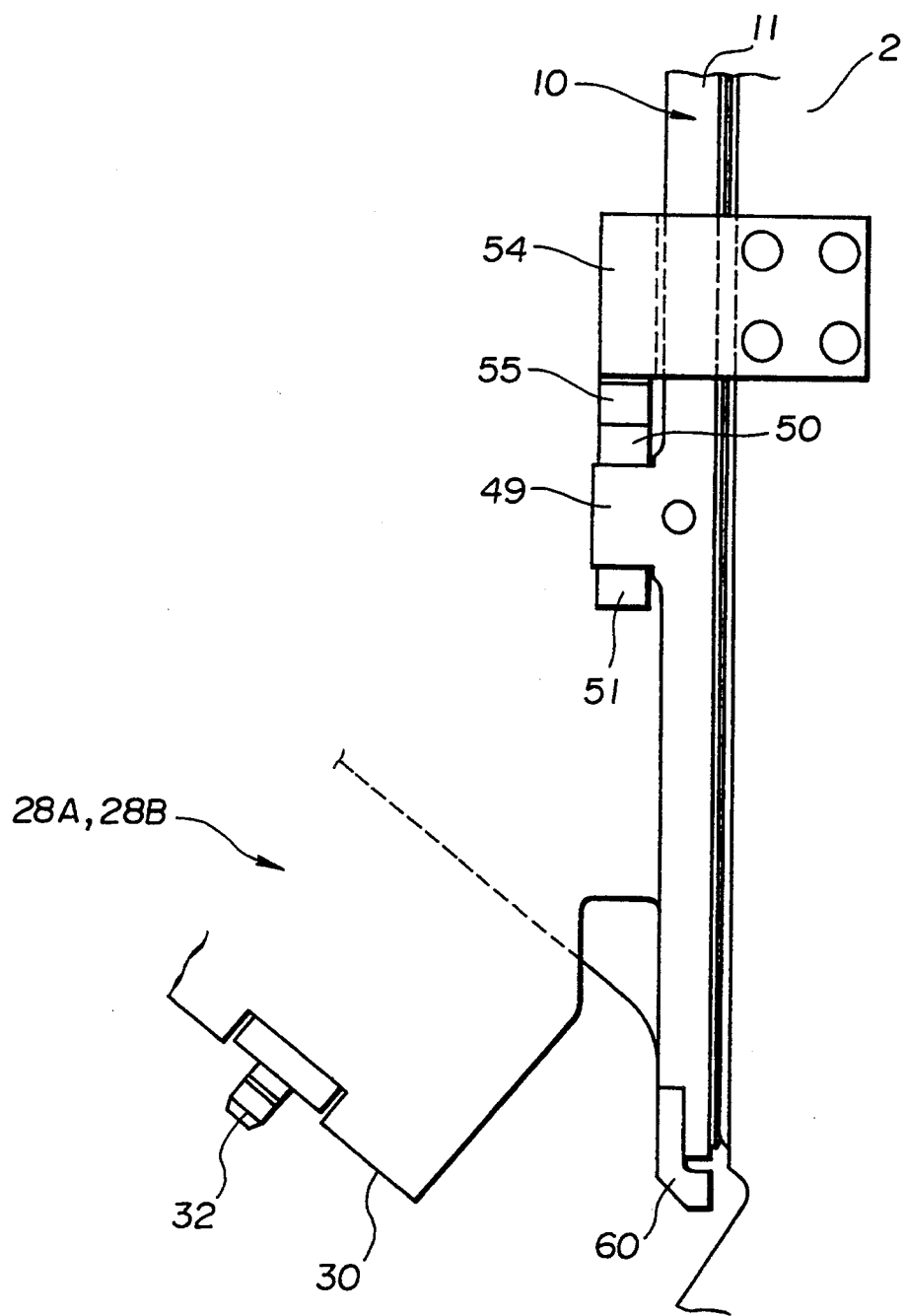
FIG. 2 is a fragmentary side elevational view of a turret head indexing, positioning, and fixing mechanism of the turret machine tool.

As shown in FIG. 3, the rib 31e which interconnects the horizontal frame members 31a of the attachment frames 31 is positioned horizontally centrally on the turret head 10 and extends vertically through the axis L. As shown in FIGS. 2 and 3, the turret head 10 has a vertically central stay 49 disposed on one side (right-hand side in FIG. 3) of the attachments 28A, 28B and extending in a direction perpendicular to the rib 31e. Two stops 50, 51 are mounted on respective opposite sides of the stay 49. The slide base 2 has a pair of attachment bosses 52, 53 projecting radially outwardly from an upper rear portion thereof on opposite sides of an upper portion of the turret head 10. Stop support blocks 54 are attached to respective lower surfaces of the attachment bosses 52, 53, and support respective stops 55, 56 on their lower surfaces for engaging the stops 50, 51.

The stops 55, 56 are spaced upwardly from a horizontal line L1 passing through the axis L of the turret head 10 by a distance equal to half the vertical dimension of the stay 49 and the stops 50, 51. When the turret head 10 is in an angular position shown in FIG. 3, the stop 50 engages the stop 55 supported by one of the stop support blocks 54 on the right-hand side in FIG. 3. When the turret head 10 is turned 180° clockwise from the position shown in FIG. 3, the stop 51 engages the stop 56 supported by the other stop support block 54 on the left-hand side in FIG. 3.

Sensors 57 for detecting the indexed position of the turret head 10 are mounted respectively on the stop support blocks 54 by respective stays 58. The hydraulic motor 17 is positioned upwardly of the left-hand attachment boss 53.

Control cams 59, 60 are mounted on the annular flanged base 11 of the turret head 10 in diametrically opposite or 180°-spaced relationship to each other. In the illustrated embodiment, the control cams 59, 60 are located in upper and lower positions, respectively, and have arcuate cam surfaces facing radially outwardly. Each of the arcuate cam surfaces has a progressively increasing cam lift.

A variable-rate control valve 61 for controlling the hydraulic motor 17 is mounted on the slide base 2 radially outwardly of the annular flanged base 11 by a support bracket 63 (see also FIG. 1). The control valve 61 is positioned above the control cam 59 which is in the upper position in FIG. 3.

The control valve 61 comprises a spool valve, for example, including a spool movable to vary the rate at which working oil flows to the hydraulic motor 17. The control valve 61 has a displaceable roller 62 coupled to a rod connected to the spool and positioned so as to be engageable by the control cams 59, 60.

In FIG. 3, when the stop 50 engages the stop 55 supported by the right-hand stop support block 54, the stay 49 is in a position α and detected by the corresponding sensor 57. At this time, the attachments 28A, 28B are in upper and lower positions, respectively, and the machining spindle module 35B supported by the attachment 28B is in the machining position.

The attachment 28B is held in the lower position by the hydraulic motor 17 under the control of the control cam 59, which is in a position β in FIG. 3 and the control valve 61. More specifically, when the turret head 10 is indexed as shown in FIG. 3, the control cam 59 displaces the roller 62 to cause the control valve 61 to supply working oil at a reduced rate to the hydraulic motor 17. The hydraulic motor 17 is actuated to rotate the pinion 18 and the annular holder 13 in one direction to rotate the turret head 10 counterclockwise to press the stop 50 against the stop 55, thereby holding the turret head 10 continuously under hydraulic pressure against a load applied while a workpiece is being machined by the machining spindle module 35B. Consequently, no separate lock mechanism is required to lock the turret head 10 in the indexed position.

To bring the machining spindle module 35A supported by the attachment 28A into the machining position, the hydraulic motor 17 is actuated to rotate the pinion 18 and the annular holder 13 in the opposite direction to rotate the turret head 10 clockwise as indicated by the arrow CLW in FIG. 3.

Initially, since the roller 62 is engaged and displaced by the control cam 59, the turret head 10 rotates slowly. When the roller 62 is disengaged from the control cam 59, the roller 62 returns and the control valve 61 supplies working oil at an increased rate to the hydraulic motor 17. Therefore, the hydraulic motor 17 rotates the turret head 10 quickly clockwise. As the turret head 10 is turned nearly 180°, the control cam 60 which was in a position γ starts to engage the roller 62 in the position β, and the stop 61 approaches the stop 56 in a position δ.

Upon continued angular movement of the turret head 10, the roller 62 is displaced progressively radially outwardly by the control cam 60. During an initial stage of engagement between the control cam 60 and the roller 62, the displacement of the roller 62 is relatively small because of the progressively increasing lift of the cam surface of the control cam 60. Then, the control cam 60 displaces the roller 62 to a progressively larger interval. Therefore, the working oil supplied to the hydraulic motor 17 is progressively reduced, decelerating the angular movement of the turret head 10.

When the turret head 10 has been turned 180°, the stay 49 has also been turned 180° from the position α to the position δ, holding the stop 51 against the stop 56. At this time, the control cam 59 is in the position γ and the attachment 28A is in the lower position, with the machining spindle module 35A in the machining position.

At this time, the hydraulic motor 17 is continuously actuated to keep the stop 51 in abutting engagement with the stop 56 in the position δ, thus locking the turret head 10 under hydraulic pressure.

As described above, an indexing operation of the turret head 10 to bring the machining spindle module 35A to the machining position is initially carried out slowly because the control cam 59 engages the roller 62. When the control cam 59 disengages the roller 62, the hydraulic motor 17 is supplied with working oil at an increased rate, and the turret head 10 is turned at a higher speed to move the machining spindle module 35A quickly to the machining position. In a final phase of indexing movement, the control cam 60 starts engaging the roller 62, the hydraulic motor 17 is supplied with working oil at a reduced rate, decelerating the turret head 10. Thus, the stop 51 is prevented from hardly hitting the stop 56, but is allowed to gently engaging the stop 56.

The machining spindle module 35B can be brought to the machining position in the same manner as described above.

Figure 9:
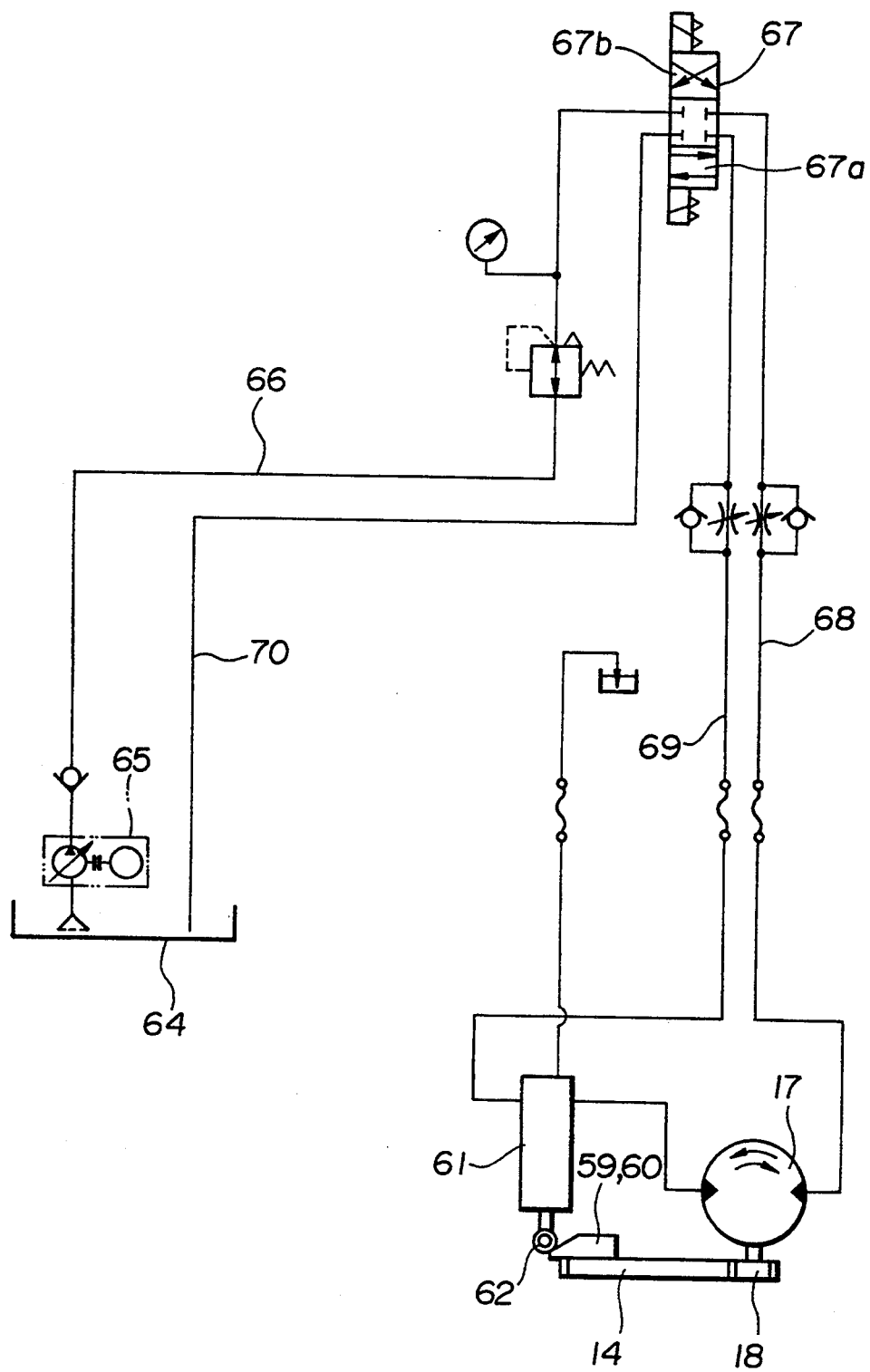
FIG. 9 is a circuit diagram of a hydraulic pressure control circuit for hydraulically controlling a hydraulic motor of the turret head indexing, positioning, and fixing mechanism.

FIG. 9 shows a hydraulic pressure control circuit for hydraulically controlling the hydraulic motor 17. As shown in FIG. 9, the hydraulic pressure control circuit includes an oil pump 65 for drawing working oil from an oil tank 64. A discharge oil passage 66 extending from the outlet port of the oil pump 65 is connected to one of two inlet ports of a directional control valve 67. One of two outlet ports of the directional control valve 67 is connected through an oil passage 68 to one of two ports of the hydraulic motor 17. The other port of the hydraulic motor 17 is connected through the control valve 61 and an oil passage 69 to the other outlet port of the directional control valve 67. The other inlet port of the directional control valve 67 is connected through a return oil passage 70 to the oil tank 64.

The directional control valve 67 is shown as being in a neutral position in FIG. 9. When the directional control valve 67 is shifted from the neutral position to an upper position, the oil passages 66, 68 are connected to each other and the oil passages 69, 70 are connected to each other by a valve port member 67a.

Working oil is therefore supplied by the oil pump 65 from the oil tank 64 through the oil passage 66, the valve port member 67a of the directional control valve 67, and the oil passage 68 to the hydraulic motor 17, actuating the hydraulic motor 17 in one direction.

The working oil supplied to the hydraulic motor 17 is discharged therefrom, and flows through the control valve 61, the oil passage 69, the valve port member 67a of the directional control valve 67, and the oil passage 70 to the oil tank 64.

While the hydraulic motor 17 is being actuated to turn the turret head 10 in one direction, the control valve 61 is caused by the control cams 59, 60 to vary the rate at which the working oil flows from the hydraulic motor 17 into the oil passage 69. The turret head 10 is therefore accelerated, decelerated, and locked in the manner described above.

When the directional control valve 67 is shifted from the neutral position to a lower position, the oil passages 66, 69 are connected to each other and the oil passages 68, 70 are connected to each other by a valve port member 67b.

Working oil is therefore supplied by the oil pump 65 from the oil tank 64 through the oil passage 66, the valve port member 67b of the directional control valve 67, and the oil passage 69, and the control valve 61 to the hydraulic motor 17, actuating the hydraulic motor 17 in the opposite direction.

The working oil supplied to the hydraulic motor 17 is discharged therefrom, and flows through the oil passage 68, the valve port member 67b of the directional control valve 67, and the oil passage 70 to the oil tank 64.

While the hydraulic motor 17 is being actuated to turn the turret head 10 in the opposite direction, the control valve 61 is caused by the control cams 59, 60 to vary the rate at which the working oil flows from the oil passage 69 into the hydraulic motor 17. The turret head 10 is therefore accelerated, decelerated, and locked in the manner described above.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A turret machine tool comprising:
   a support base;
   a slide base slidably mounted on said support base and having a slant surface;
   a turret head indexably disposed on said slant surface of the slide base for indexing movement about an axis;
   a plurality of machining spindle modules mounted on said turret head at intervals about said axis and projecting outwardly from said turret head;
   said turret head having a plurality of attachments each including an outwardly open cavity and an attachment frame defining said outwardly open cavity and having an outer attachment surface;
   each of said machining spindle modules having a front module portion, a rear module portion extending rearwardly from said front module portion, and a front plate integral with said front module portion and disposed between and coupled to said front module portion and said rear module portion, said front plate having an attachment edge extending radially outwardly beyond said rear module portion, said machining spindle modules being installed on said attachments, respectively, with the rear module portions being housed in the cavities, respectively, and the attachment edges being held against the outer attachment surfaces, respectively, said rear module portion of each of said machining spindle modules having a sleeve assembly extending rearwardly and fitted in a hole defined in and extending through a bottom wall of said outwardly open cavity, said turret head having a cavity defined therein behind the bottom walls of said outwardly open cavities, and wherein said front module portion of each of said machining spindle modules comprises a spindle housing which supports a plurality of spindles therein, and said rear module portion of each of said machining spindle modules comprises a gear case which houses a transmission gear mechanism including at least an input shaft extending coaxially through said sleeve for transmitting drive forces to said spindles having an end projecting into said cavity in said turret head, further comprising an actuator supported on said slide base and having an output shaft for rotating said spindle through said transmission gear mechanism, and clutch means disposed in said cavity for selectively connecting and disconnecting said input shaft and said output shaft.

2. A turret machine tool according to claim 1, wherein said rear module portion of each of said machining spindle modules further includes a seal ring fitted over the sleeve assembly which is fitted in said hole.

3. A turret machine tool according to claim 1, wherein said slant surface is inclined at at least 45° to a direction in which said slide base is slidable on said support base, and said axis is inclined at at least 45° to said direction.

4. A turret machine tool comprising:
   a support base;
   a slide base slidably mounted on said support base and having a slant surface;
   a turret head indexably disposed on said slant surface of the slide base for indexing movement about an axis;
   a plurality of machining spindle modules mounted on said turret head at intervals about said axis and projecting outwardly from said turret head;

said turret head having a plurality of attachments each including an outwardly open cavity and an attachment frame defining said outwardly open cavity and having an outer attachment surface;

each of said machining spindle modules having a front module portion, a rear module portion extending rearwardly from said front module portion, and a front plate integral with said front module portion and disposed between and coupled to said front module portion and said rear module portion, said front plate having an attachment edge extending radially outwardly beyond said rear module portion, said machining spindle modules being installed on said attachments, respectively, with the rear module portions being housed in the cavities, respectively, and the attachment edges being held against the outer attachment surfaces, respectively;

a first stop mounted on said turret head;

a second stop mounted on said slide base for engaging said first stop when said first stop is angularly moved with said turret head upon indexing movement thereof;

a motor mounted on said slide base for angularly moving said turret head about said axis to bring said first stop into engagement with said second stop and pressing said first stop against said second stop thereby to index and lock said turret head with respect to said slide base;

a control cam mounted on an outer edge of said turret head;

control valve means mounted on said slide base and engageable by said control cam for producing a progressively increasing control quantity in response to angular movement of said turret head, before said first stop engages said second stop; and fluid pressure control means for progressively reducing a fluid pressure supplied to said fluid pressure motor in response to the progressively increasing control quantity produced by said control valve means for thereby reducing a speed at which said turret head is angularly moved, before said first stop engages said second stop.

5. A turret machine tool according to claim 4, wherein said fluid pressure control means comprises means for keeping a predetermined fluid pressure supplied to said fluid pressure motor to maintain said first stop in engagement with said second stop for thereby keeping said turret head indexed and locked with respect to said slide base, after said first stop has engaged said second stop.

6. A turret machine tool according to claim 4, further comprising a bearing disposed between said slide base and said turret head under a preload applied to said bearing.

7. A turret machine tool comprising:

a support base;

a slide base slidably mounted on said support base and having a slant surface;

a turret head indexably disposed on said slant surface of the slide base for indexing movement about an axis;

a plurality of machining spindle modules mounted on said turret head at intervals about said axis and projecting outwardly from said turret head;

said turret head having a plurality of attachments each including an outwardly open cavity and an attachment frame defining said outwardly open cavity and having an outer attachment surface, each of said attachments including clamp means for fastening said front plate to the attachment frame, said front plate having a plurality of engageable members, said clamp means comprising a plurality of toggle clamps mounted on said attachment frame for engaging said engageable members, respectively, said attachment frame comprising two first frame members extending substantially parallel to each other and a second frame member extending between and joining ends of said first frame members, each of said first frame members having two of said toggle clamps;

each of said machining spindle modules having a front module portion, a rear module portion extending rearwardly from said front module portion, and a front plate integral with said front module portion and disposed between and coupled to said front module portion and said rear module portion, said front plate having an attachment edge extending radially outwardly beyond said rear module portion, said machining spindle modules being installed on said attachments, respectively, with the rear module portions being housed in the cavities, respectively, and the attachment edges being held against the outer attachment surfaces, respectively.

8. A turret machine tool according to claim 7, wherein said front plate has a positioning hole defined therein, said attachment frame having a positioning pin projecting on said outer attachment surface and fittable in said positioning hole for positioning the machining spindle module with respect to said turret head.

* * * * *